June 27, 1950  V. B. HANEY  2,513,020
GOLF CLUB CART
Filed Dec. 10, 1946

Inventor
V. B. HANEY
By Mason, Fenwick & Lawrence
Attorneys

Patented June 27, 1950

2,513,020

UNITED STATES PATENT OFFICE 2,513,020

GOLF CLUB CART

Virgil B. Haney, Corpus Christi, Tex.

Application December 10, 1946, Serial No. 715,283

9 Claims. (Cl. 280—51)

This invention relates to a golf club cart or wheeled carrier for golf clubs, which takes the place of the conventional golf bag, relieving the golfer of the weight and encumbrance of the bag so that, if desired, he may dispense with a caddie and transport his clubs himself over the links without fatigue. It has other advantages, such as protection of the clubs from being banged against one another as in a bag, permits ready selection and replacement of the clubs, and provides a convenient receptacle for balls and tees at a height which avoids stooping, and can be reduced in size for convenient stowing in a locker.

One of the objects of the invention is to provide a golf club cart which may be trundled either by pushing or pulling, and when at rest in its erect position, has a three point base of support in which the center of gravity is well within the area of the supporting base, and low down, by virtue of the weight of the heads of the irons, giving great stability to the cart so that clubs may be removed or replaced without the risk of upsetting the cart.

Another object of the invention is the provision of a golf club cart having a body receptacle or tray adjacent its lower end, with individual compartments for the heads of the irons, disposed in tilted position when the cart is in its stable erect position, having holes in the front walls of said compartments, permitting drainage of rainwater, and also serving as outlets for ridding the compartments of grass or dirt which may be dropped from the irons.

Another object of the invention is to provide a golf club cart having a longitudinal frame carrying the wheels and the body receptacle at its lower end and a ball and tee compartment at its upper end, said compartment being carried at such height when the cart is in erect position, as to give access thereto without the necessity of stooping.

A further object of the invention is to provide a golf club cart in which the intermediate portion of the frame is formed as a narrow strut, carrying a handle close to the center of gravity, whereby the cart may be carried in approximately balanced position without the frame interfering with the locomotion of the bearer.

Still another object of the invention is to provide a golf club cart in which the frame is provided with a handle employed when trundling the cart, hinged to the narrow strut portion of the frame and foldable thereagainst when not in use, the carrying handle being formed of spaced longitudinal halves forming a clamp within which the trundling handle is held when in folded down position.

Still another object of the invention is to provide a golf club cart in which the wheels may be pushed to a position of minimum spacing for reducing the overall width of the cart in adapting it to fit into a locker.

Other objects of the invention will appear as the following description of a preferred and practical embodiment thereof proceeds.

In the drawing throughout the several figures of which the same reference characters have been employed to denote identical parts:

Figure 3:
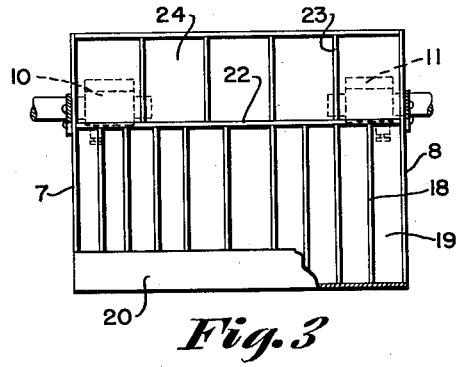
Figure 3 is a plan view of the body receptacle, partly in section.

Referring now in detail to the several figures, the numeral 1 refers to the frame of the golf club cart as a whole, which in the illustrated embodiment, is formed of a pair of symmetrically juxtaposed metallic members 2 and 3, expanded into a yoke 4 at the lower end, and expanded into a smaller yoke 5 at the upper end, the intermediate portions of said members 2 and 3 extending side by side in parallel rectilinear relation and slightly spaced apart, forming a narrow strut.

The body receptacle 6 of the cart comprises a shallow rectangular box, to the sides 7 and 8 of which the side members of the yoke 4 are secured in any suitable manner, screws 9 being employed in the illustrative example. The frame 1 is secured to the body receptacle in a slightly inclined position with respect to a perpendicular transverse plane through said receptacle.

Figure 2:
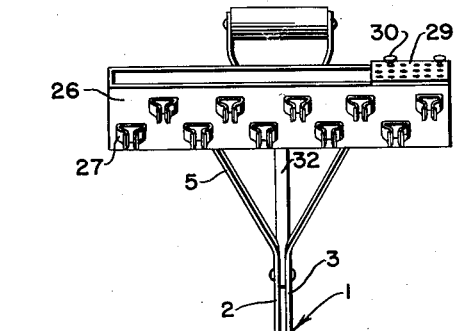
Figure 2 is a front elevation viewing Figure 1 from the left, the golf clubs being omitted.

To the bottom of the body receptacle 6 the elongated guide lugs 10 and 11 are secured, having cylindrical bores through which axle sections 12 and 13 slidably fit. Vehicle wheels 14 are journaled on the outer ends of the axle sections. It will be noted, particularly from Figure 1, that the lugs 10 and 11 and the axle sections are not under the center of the body receptacle, but displaced toward one edge thereof. At the opposite edge is a ground engaging supporting foot 15, arranged at the middle of the forward edge of the body receptacle, as shown in Figure 2, and slidable in a front to rear direction through a keeper 16, secured to the bottom of the body receptacle. The sliding foot 15 has a downturned rear end 17 which retains it within the keeper.

Figure 1:
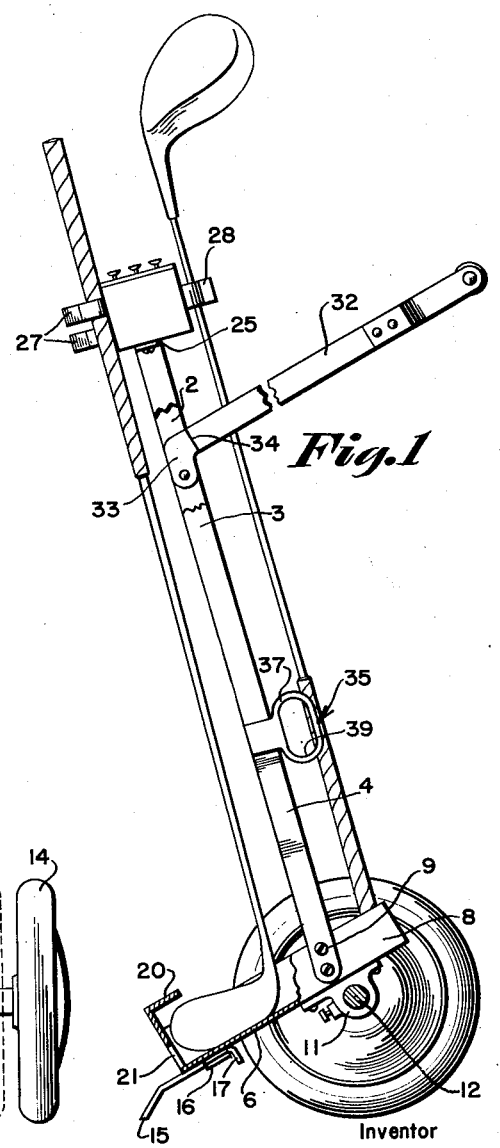
Figure 1 is a side elevation of the golf club cart, partly in section.

The wheels and the foot 15 constitute a three point base of support, and the height dimension of the foot 15 relative to the radius of the wheels 14 is such that when the cart is placed in its erect position shown in Figure 1, the body receptacle 6 is tilted forwardly with the center of gravity of the cart well within the area of the base of support. It will be noted from Figure 1 that the heads of the irons rest in the body receptacle within the area of the base of support. Their weight causes the center of gravity to be very low, imparting great stability to the golf cart when in erect position, so that it will not be readily upset even by careless use in removing or replacing the clubs.

Figure 3, in particular, shows that the forward part of the body receptacle is divided by partitions 18 into a plurality of side by side compartments 19, for the individual reception of the heads of the several irons, and to assure that the irons will be arranged in definite order to permit ready selection, the width of the several compartments is varied to suit the shape of the heads of the different irons.

The forward portion of the body receptacle is provided with a ledge 20, overlying the forward ends of the compartments 19, to prevent the irons being jarred from position when the cart is trundled over rough ground, and the forward ends of said compartments are open, being provided with the holes 21, terminating at the level of the bottoms of said compartments, and being sufficiently small to prevent the heads of the irons from passing through them. These holes permit drainage of water from the compartments, should the game be played in the rain, and also form openings to facilitate ridding the compartments from dirt or grass which may be dropped from the heads of the irons.

Figure 3 shows that the body compartment is provided with an intermediate transverse partition 22, forming the back ends of the compartments 19. Other partitions 23 are provided, dividing the rear portion of the body receptacle into a plurality of compartments 24, which are to receive the ends of the shafts of the woods, which are placed in inverted position in the cart.

The upper or smaller yoke 5 of the frame is outwardly spread into transverse extensions 25, affording a transverse support, to which the ball and tee compartment 26 is secured. This compartment is a box, the length of which preferably does not exceed that of the body receptacle 6, being sufficiently deep and wide to conveniently hold a plurality of golf balls, and is carried at such height as to prevent stooping when selecting a ball. The forward side of the ball and tee compartment is provided with a plurality of spring clips 27, adapted to yieldingly receive and retain the shafts of the irons. These clips are preferably arranged in staggered relation in two rows, to give more room, and thus facilitate the placing of the clubs in said clips.

On the opposite side the ball and tee compartment is provided with a row of similar clips 28, to receive the shafts of the woods.

At one end, the ball and tee compartment is overlain by a tee plate 29, suitably secured thereto, having a plurality of perforations, each frictionally receiving the stem of a tee 30.

A long handle 32, employed in trundling the golf club cart, is hingedly mounted near the upper end of the narrow or strut portion of the frame 1, by means of an angular hinge 33, which as shown, is mounted between the spaced parallel rectilinear portions of the juxtaposed frame members 2 and 3. The handle 32 is thicker widthwise than the hinge, so that the juncture 34, between the handle and hinge, forms a stop against the frame, as shown in Figure 1, limiting further upward swing of the handle. As shown, the handle and hinge are an integral construction. When not in use, the handle folds downwardly against the frame, as is indicated in Figure 2.

For convenient carrying of the golf club cart, it is provided with a carrying handle 35, secured to the strut portion of the frame, at a point sufficiently close to the center of gravity of the loaded golf club cart to approximately balance the weight of the cart when carried. As shown, the handle 35 is formed of two similar members 36 and 37, congruently arranged, secured respectively to the juxtaposed frame members 2 and 3, and spaced apart. When the trundling handle 32 is in folded down position, it lies between the parts 36 and 37 and below the open loops 39, through which the handle extends when carrying the cart. Preferably, the trundling handle 32 fits frictionally between the handle parts 36 and 37, so that the latter act as a clamp in holding the handle 32. The inclined relation of the spread portions of the frame members which form the yoke 4, prevent interference of the yoke 4 with the locomotion of the person when carrying the cart.

Figure 4:
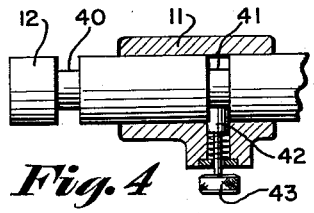
Figure 4 is a fragmentary detail view partly in elevation, partly in section of one of the adjustable axle sections.

Since it is desirable to reduce the overall size of the cart as much as possible, for stowing it in a locker, this is in part done by folding the trundling handle 32 down, as indicated in Figure 2. Further reduction is accomplished by pushing in the sliding foot 15. The overall width dimension is reduced by pushing in the wheels 14 to the broken line positions shown in Figure 2, in which the wheels rest against the cart. Figure 4 shows that the axle sections 11 and 12 are each formed with spaced peripheral channels 40 and 41, the former representing the outmost extension of the axle sections, and the latter the inmost position. A spring detent 42, carried by each of the lugs 10 and 11, selectively engages one or the other of said channels. By pulling out the knob 43 of the detent, and drawing out the axle sections, the detent springs into the channel 40, holding the wheels in extended position. By pulling out the detent and pushing in the axle sections, the detent springs into the channel 41, holding the wheels in retracted position. If desired, the wheels and axle sections may be entirely removed from the lugs 11, by holding out the detents and withdrawing the axle sections from said lugs.

While I have in the above description disclosed what I believe to be a preferred and practical embodiment of the invention, it will be understood by those skilled in the art that the specific details of construction and arrangement of parts, as shown, are by way of illustration and not to be construed as limiting the scope of the invention.

What I claim as my invention is:

1. Golf club cart comprising a body formed as a receptacle for the heads of the irons, a narrow frame extending upwardly from said body, means on said frame remote from said body for holding the shafts of the irons, a pair of spaced vehicle wheels supporting said body adjacent the rear end, a ground engaging foot for supporting said body at the front end forming with said vehicle wheels a base of support, the height of said foot with respect to the radius of said wheels being such as to support said body in forwardly inclined position with the center of gravity of said cart within the area of said base of support, an elongated trundling handle hingedly secured to said narrow frame, foldable downwardly thereagainst, and a carrying handle on said frame adjacent the center of gravity of said cart, formed of laterally spaced congruently disposed parts having congruent hand holes, said trundling handle when in downfolded position extending between said parts with said hand holes extending above said trundling handle.

2. Golf club cart comprising a shallow box-like body having a plurality of partitions dividing its forward portion into a transverse row of compartments for receiving the heads of the irons, a narrow frame extending upwardly from said body, means on said frame remote from said body for holding the shafts of the irons, a pair of spaced wheels supporting said body adjacent its rear end, a ground-engaging foot for supporting said body at the front end forming with said vehicle wheels a base of support, the height of said foot with respect to the radius of said wheels being such as to support said body in forwardly inclined position with the center of gravity of said cart within the area of said base of support, the front ends of said compartments being formed with holes extending to the bottoms of said compartments, an elongated trundling handle hingedly secured to said narrow frame, foldable downwardly thereagainst, and a carrying handle on said frame adjacent the center of gravity of said cart, formed of laterally spaced congruently disposed parts having congruent hand holes, said trundling handle when in downfolded position extending between said parts with said hand holes extending above said trundling handle.

3. Golf club cart comprising a shallow box-like body having a plurality of partitions dividing its forward portion into a transverse row of compartments for receiving the heads of the irons, said compartments being of different widths corresponding respectively to the widths of the heads of particular irons, a narrow frame extending upwardly from said body, means on said frame remote from said body for holding the shafts of the irons, a pair of spaced wheels supporting said body adjacent its rear end, a ground-engaging foot for supporting said body at the front end forming with said vehicle wheels a base of support, the height of said foot with respect to the radius of said wheels being such as to support said body in forwardly inclined position with the center of gravity of said cart within the area of said base of support, the front ends of said compartments being formed with holes extending to the bottoms of said compartments, an elongated trundling handle hingedly secured to said narrow frame, foldable downwardly thereagainst, and a carrying handle on said frame adjacent the center of gravity of said cart, formed of laterally spaced congruently disposed parts having congruent hand holes, said trundling handle when in downfolded position extending between said parts with said hand holes extending above said trundling handle.

4. Golf club cart comprising a body formed as a receptacle for the ends of golf clubs, a frame extending upwardly from said body, means on said frame remote from said body for holding the shafts of the golf clubs, a pair of spaced vehicle wheels supporting said body adjacent the rear end, extending beyond the sides of said body, a ground-engaging foot for supporting said body at the front end forming with said vehicle wheels a base of support, the height of said foot with respect to the radius of said wheels being such as to support said body in forwardly inclined position with the center of gravity of said cart within the area of said base of support, spaced coaxial axle sections slidably mounted beneath said body, each carrying one of the vehicle wheels permitting a range of width spacing of said wheels, means for holding said axle sections in alternative positions of wide and narrow spacing positions of said wheels, an elongated trundling handle hingedly secured to said frame, foldable downwardly thereagainst, and a carrying handle on said frame adjacent the center of gravity of said cart, formed of laterally spaced congruently disposed parts having congruent hand holes, said trundling handle when in downfolded position extending between the parts of said carrying handle with said hand holes extending above said trundling handle.

5. Golf club cart comprising a frame having a narrow intermediate portion expanded at its upper and lower ends to form yokes, a body formed as a receptacle for the ends of golf clubs, embraced between the sides of the lower yoke and secured thereto, a box for golf balls secured to the sides of the upper yoke, clips on the outside of said box for receiving and holding the shafts of the golf clubs, a pair of spaced vehicle wheels supporting said cart adjacent the rear of said body, an elongated trundling handle for pushing and pulling said cart, hingedly secured to the intermediate portion of said frame and foldable downwardly to a position thereagainst, said trundling handle being formed with a stop engageable with said frame to limit the extent of upward swing of said handle, and a carrying handle on said intermediate portion adjacent the center of gravity of said cart, formed of laterally spaced congruently disposed parts having congruent hand holes, said trundling handle when in downfolded position extending between said parts with said hand holes extending above said trundling handle.

6. Golf club cart comprising a frame having a narrow intermediate portion expanded at its upper and lower ends to form yokes, a body formed as a receptacle for the ends of golf clubs, embraced between the sides of the lower yoke and secured thereto, a box for golf balls secured to the sides of the upper yoke, clips on the outside of said box for receiving and holding the shafts of the golf clubs, a pair of spaced vehicle wheels supporting said cart adjacent the rear of said body, an elongated trundling handle for pushing and pulling said cart, hingedly secured to the intermediate portion of said frame and foldable downwardly to a position thereagainst, and a carrying handle on the intermediate portion of said frame adjacent the center of gravity of said cart, formed of spaced congruently disposed parts, said trundling handle when in down-folded position extending between the parts of said carrying handle.

7. Golf club cart comprising a frame having a narrow longitudinal middle portion and a lower bifurcated portion, a body embraced within the sides of said bifurcated portion and secured thereto, said body being formed as a box with partitions dividing it into a forward transverse row of compartments for the heads of irons and a rearward transverse row of compartments for the ends of the shafts of the woods, a box for golf balls secured to the upper part of said frame having a double row of clips on the forward side for receiving and holding the shafts of the irons, and clips on the rear side for receiving and holding the shafts of the woods near the heads, the clips in the rows on the forward side being in staggered relation, a pair of spaced vertical wheels supporting said cart adjacent the rear of said body an elongated trundling handle for pushing and pulling said cart hingedly secured to the intermediate portion of said frame and foldable downwardly to a position thereagainst, and the carrying handle on said middle portion adjacent the center of gravity of said cart formed of laterally spaced congruently disposed parts having congruent hand holes, said trundling handle when in downfolded position extending between said parts with said hand holes extending above said trundling handle.

8. Golf club cart comprising a frame having a narrow intermediate portion expanded at its lower end to form a yoke, a body formed as a receptacle for the ends of golf clubs embraced between the sides of said yoke and secured thereto, an open topped box for golf balls secured to the upper part of said frame, clips on the outside of said box for receiving and holding the shafts of the golf clubs, a tee plate bridging a portion of the open top of said box having perforations for receiving tees, a pair of spaced vertical wheels supporting said cart adjacent the rear of said body, an elongated trundling handle for pushing and pulling said cart, hingedly secured to the intermediate portion of said frame and foldable downwardly to a position thereagainst, and a carrying handle on said intermediate portion adjacent the center of gravity of said cart, formed of laterally spaced congruently disposed parts having congruent hand holes, said trundling handle when in downfolded position extending between said parts with said hand holes extending above said trundling handle.

9. Golf club cart comprising a frame having a narrow intermediate portion expanded at its upper and lower ends to form yokes, a body formed as a receptacle for the heads of golf clubs secured to the sides of the lower yoke, a box for golf balls secured to the sides of the upper yoke, an elongated trundling handle hingedly secured to the intermediate portion of said frame between said yokes and adjacent the upper yoke, foldable downwardly against said intermediate portion, and a carrying handle on said intermediate portion adjacent the center of gravity of said cart, formed of laterally spaced congruently disposed parts having congruent hand holes, said trundling handle when in down-folded position nesting between the parts of said carrying handle, with said hand holes extending above said trundling handle.

VIRGIL B. HANEY.

REFERENCES CITED

The following references are of record in the file of this patent:

UNITED STATES PATENTS

| Number | Name | Date |
|---|---|---|
| D. 142,513 | Cross | Oct. 9, 1945 |
| 603,676 | Clark | May 10, 1898 |
| 1,287,200 | Botsford | Dec. 10, 1918 |
| 1,581,061 | Johnston | Apr. 13, 1926 |
| 1,707,186 | Chatfield | Mar. 26, 1929 |
| 2,044,363 | Morse et al. | June 16, 1936 |
| 2,124,265 | Sinnott | July 19, 1938 |
| 2,131,673 | Robinson | Sept. 27, 1938 |
| 2,262,298 | Procter | Nov. 11, 1941 |
| 2,392,926 | Kelly | Jan. 15, 1946 |
| 2,406,183 | Allen | Aug. 20, 1946 |
| 2,415,392 | Morehouse | Feb. 4, 1947 |